United States Patent

Harvey

[15] 3,653,762
[45] Apr. 4, 1972

[54] AUTOMATIC RANGEFINDER
[72] Inventor: Donald M. Harvey, Webster, N.Y.
[73] Assignee: Eastman Kodak Company, Rochester, N.Y.
[22] Filed: Sept. 28, 1970
[21] Appl. No.: 76,081

[52] U.S. Cl. ..................................356/4, 95/44 C, 350/46
[51] Int. Cl. ..........................................................G01c 3/08
[58] Field of Search.....................356/4, 5; 95/44 C; 350/46; 178/7.92

[56] References Cited

UNITED STATES PATENTS 3,274,913  9/1966  Biedermann et al. ...................95/44 C
3,435,744  4/1969  Stimson ......................................356/4

Primary Examiner—Samuel Feinberg
Assistant Examiner—S. C. Buczinski
Attorney—Robert W. Hampton and Raymond L. Owens

[57] ABSTRACT

Apparatus is disclosed for positioning an objective lens to focus an image of an object in a film plane which includes means for projecting a contrast pattern on the object, and a second lens for receiving and transmitting light reflected from the object to form an image of the contrast pattern upon a photocell. The photocell has a particular discernable output when the image is focused on the photocell. The apparatus also includes a mechanism for varying the distance between the second lens and the photocell to focus the image formed by the second lens upon the photocell and means responsive to the particular discernable output to position the objective lens so that the image of the object formed by the objective lens is focused in the film plane.

12 Claims, 6 Drawing Figures

DONALD M. HARVEY
INVENTOR.

BY Raymond L. Owens
Robert W. Hampton

ATTORNEYS

DONALD M. HARVEY
INVENTOR.
BY Raymond L. Owens
Robert W. Hampton
ATTORNEYS

AUTOMATIC RANGEFINDER

BACKGROUND OF THE INVENTION

This invention relates to an automatic rangefinder and especially to rangefinders suitable for use with cameras.

It has previously been recognized that when the relative distance between a photocell such as a sulfide or cadmium cell and a lens is varied by moving the lens in an effort to focus an image of an object onto the photocell, a perturbation occurs in the photocell electrical output as the lens passes through the position wherein the image is focused on the photocell which is due to the property of such cells that they will exhibit different outputs for uniform and nonuniform distributions of light over their surface, despite the fact that the total amount of light remains a constant. This effect has been difficult to use inasmuch as in the instance of low contrast objects such as blank walls, the effect is minimal and extremely difficult to detect.

SUMMARY OF THE INVENTION

In accordance with a disclosed embodiment of the invention, there is provided an objective lens which is adapted to focus an image of an object in a film plane, and second and third lenses mounted so as to be movable in synchronism. An image having a contrast pattern is formed by the second lens on the object. Reflected light which includes the contrast pattern is directed to a photocell by means of the third lens. The second and third lenses are moved in synchronism until a perturbation is detected in the output of the photocell, indicating that the contrast of the reflected image is maximum and that the second lens is sharply focusing the image of the object on the photocell. Means responsive to such perturbation are effective to focus the objective lens. The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
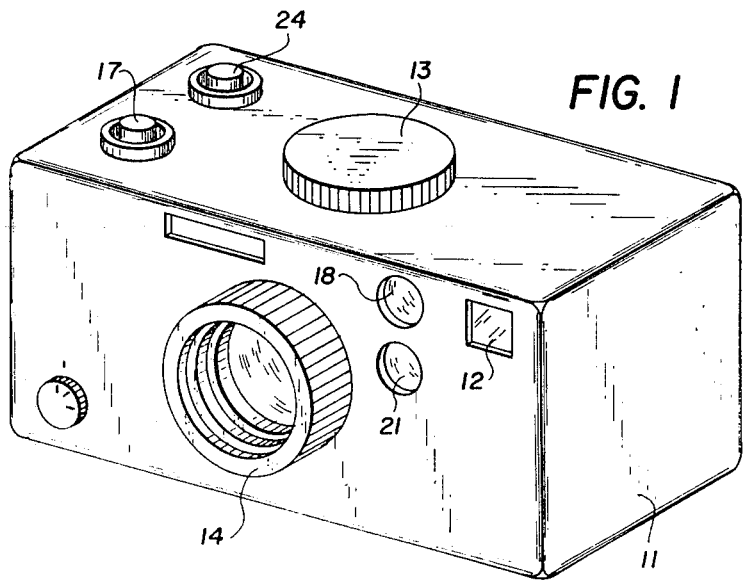
FIG. 1 is a perspective view of a photographic camera including an exemplary automatic rangefinder of the type contemplated by the invention.

Referring to FIG. 1, an embodiment of the invention is disclosed in connection with a still camera 11 of general arrangement well known in the art and having the usual standard equipment including a viewfinder aperture 12, a film winding mechanism 13, an objective lens assembly 14, a shutter 42 (See FIG. 2), and a shutter release button 17. It will be understood that the invention is equally applicable to movie cameras and other apparatus.

Figure 2:
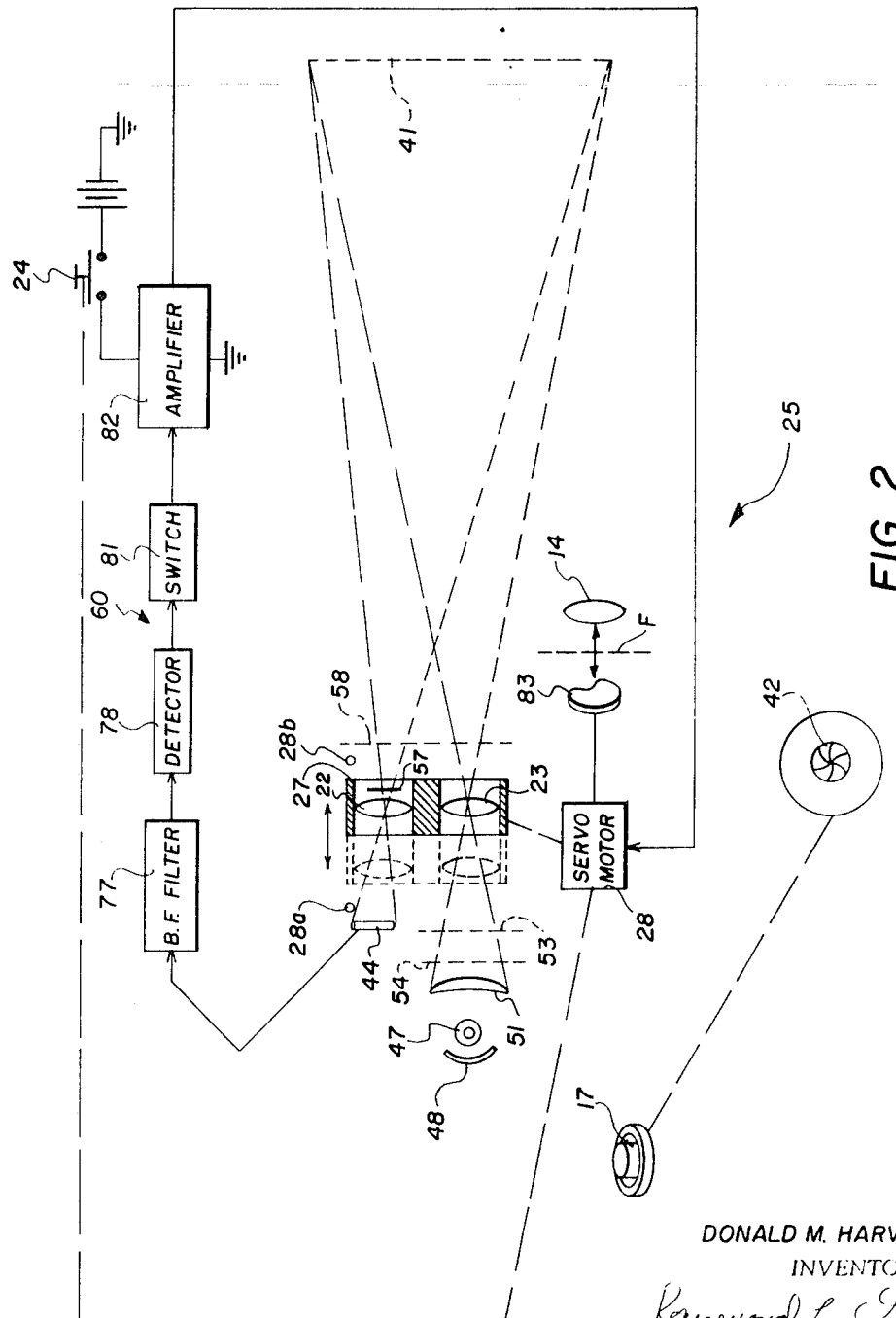
FIG. 2 is a schematic showing of the overall automatic rangefinder apparatus which may be incorporated in the camera shown in FIG. 1.

In accordance with the invention the camera 11 is provided with apertures 18 and 21 for a photocell lens 22 and a lens 23 (shown in FIG. 2) respectively, and a motor start button 24, the functions of which will become apparent from the description which follows. Referring now to FIG. 2, there is shown a rangefinder apparatus 25, including a lens assembly comprising the photocell lens 22 and the lens 23, mounted in a suitable carriage 27 which is movable forward and reverse (in the direction of the arrows but within limits defined by stops 28a and 28b by an electric motor 28.

The lenses 22 and 23 are preferably identical and are supported by the carriage 27 in duplex relationship so that during use of the camera, they are positioned substantially the same distance from the object 41, and they are movable in synchronism by the motor 28. The object 41 is in a line of sight view of objective lens 14 of the camera 11. Reflected light from the object is projected by the lens 22 upon a photocell 44 and the resulting output therefrom is provided as an input to suitable circuitry described hereinafter, for controlling the motor 28 to focus the image of the object 41 formed by the camera objective lens 14 in a film plane F. For clarity of illustration some details of the camera 11 have been omitted. For example, the lens 14 is, of course, disposed between the object 41 and the film plane F. The photocell 44 is advantageously disposed along the lens axis of the lens 22 and is of a general class of devices wherein its electrical output is related to the magnitude and contrast of incident light such as the aforementioned sulfide or cadmium cells which have an electrical output which varies directly with the amount of light incident thereon, but also have the characteristic that their output changes when the distribution of incident light varies even when the total incident light remains the same. This phenomenon is characterized by the fact that the output will vary abruptly (viz. a perturbation) at the point where the cell is moved through a position when an image of an object is sharply focused thereon.

In accordance with the invention, the perturbation effect is augmented. Towards this end, there is provided a suitable light source 47 with reflector 48 for projecting light rays through a plano-convex lens 51 to the transmitting lens 23. In order to provide contrast to the object, a transparency 53 passes light which is directed to the object 41. Advantageously, the transparency 53 is formed with a checkerboard pattern of light and dark areas. The projected light rays are pulsated at a predetermined frequency either electrically or by suitable mechanical means such as the illustrated mechanical chopper 54 which increases the effectiveness of the apparatus 25, especially in the process of electrically detecting a perturbation in the output of the photocell 44 as described later in this specification.

Advantageously, the transparency 53 and the photocell 44 are so disposed that they occupy the same position relative to their respective lenses (viz. they are disposed at optical conjugate positions). Thus, when the projected light which passes through the transparency forms a pattern which is blurry when projected on the object 41, so too the reflected image is rendered even more blurry by the lens 22 when transmitted to form an image on the photocell 44. However, when both lenses are focused at the same time and the contrast of the reflected image is a maximum, the perturbation effect is more pronounced at the output from the photocell 44 inasmuch as the contrast of the image formed on the object is a maximum. The photocell lens 22 may advantageously be provided with a centrally positioned stop means 57 to prevent the passage of all except the rim rays, which further enhances the perturbation effect.

The perturbation effect can be still further enhanced by improving the contrast of the reflected image formed on the photocell 44. Towards this end, there is provided a band pass optical filter represented by dotted line 58 which is designed to limit the emission spectrum of the light 47 and the receiving spectrum of the photocell 44 to that portion of the light spectrum to which the photocell 44 is most responsive. Thus, by reducing the general ambient light seen by the photocell, the signal to noise output of the photocell 44 can be enhanced. This effect could also be achieved by placing the filter 58 only in front of the receiving lens 22 although the illustrated arrangement is preferred.

To commence operation, the button 24 is depressed which may be arranged to close contacts and apply a source of potential to the motor 28, light source 47, and a circuit 60 hereinafter described. The reflected image of the object having the contrast pattern is formed by the lens 22 on the photocell 44. The resulting electrical output of the photocell 44 in volts, is discounting noise relatively smooth line curve (except at the best focus position, see FIG. 3) and is applied to the circuit 60 which includes a band-pass filter 77, adapted to pass frequency components centered on the frequency of the chopper 54. The fileterd output is then applied to a current detector 78. The detector output is applied to a switch network 81 which is designed to maintain a constant signal to an amplifier 82 so long as the photocell output remains on the smooth portion of the curve of FIG. 3, but functions to switch the amplifier OFF when perturbation in the photocell output occurs. The output from amplifier 82 is applied as a driving voltage to the servo motor 28, and thus when it is cut off, it causes the motor 28 to stop.

The servo motor 28 may take various forms known in the art such as a traversing lead screw arrangement used for imparting transverse motion to such items as coil winders, line guides, or the like. Whatever arrangement is used, as the motor 28 is operated, lens carriage 27 is moved back within the limits defined by stops 28a and 28b (shown schematically near the carriage 27) searching for the best focus position and when it is found, the search is ended by stopping the motor 28. The carriage is initially moved from a position corresponding to infinity focus for the lens 22 (see point "A" on the curve of FIG. 3) to the position wherein the lens 22 sharply focuses the image of the object 41 on the photocell 44 and a perturbation occurs. At this position the carriage is stopped. If a perturbation is not detected, then the objective lens 14 should be disposed at an infinity focus position.

In order to focus the objective lens 14, the motor 28 is adapted to rotate a lens adjusting cam 83 such that all of the lenses 22, 23, and 14 will simultaneously be in focus when the perturbation is detected and the motor stopped. Other means which are effective to focus the lens 14 in response to the perturbation will undoubtedly suggest themselves to those skilled in the art.

Figure 3:
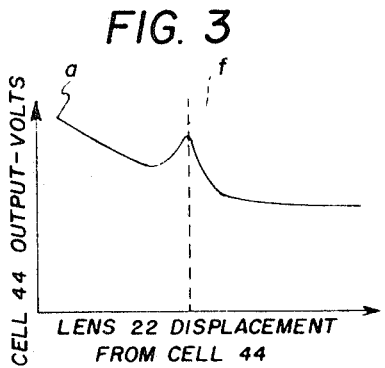
FIG. 3 is a curve of the lens displacement vs. photocell output relationship for the apparatus of FIG. 2.

Referring in detail to FIG. 3, the illustrated curve is a typical lens displacement vs. cell output curve resulting when the carriage 27 is moved. For sake of illustration, the curve is shown smooth and depicts a gradual decrease in the cell output with lens displacement from the infinity position "a" on the curve. This is, of course, due to the fact that the amount of light directed to the photocell 44 decreases as the lens 22 moves away from the photocell. However, a marked discontinuity or perturbation occurs in the curve as the lens passed through the point of best or optimum focus indicated by dotted line "f" wherein the image formed by the lens 22 on the photocell 44 is focused and the contrast pattern is a maximum. The provision of contrast to the light reflected from the object 41 results in a readily detectable rise in the curve. The curve may, of course, not be completely smooth due to noise in the output of the cell 44, but this small ripple should not be enough to actuate the switch 81. Thus, where the term smooth is used, it will be understood to be used in a relative sense.

Figure 4:
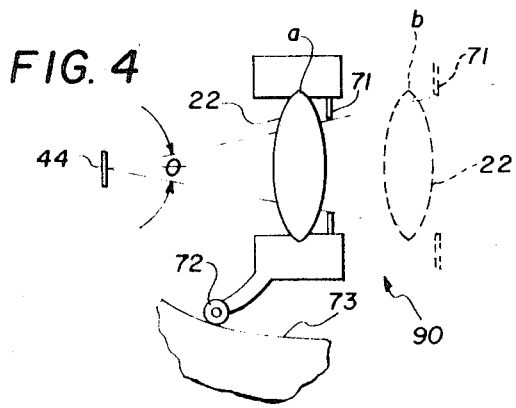
FIG. 4 is a schematic showing of a lens assembly which may be used with the FIG. 2 apparatus.

Turning now to an alternate lens assembly 90 shown in FIG. 4, there is provided an arrangement for maintaining the acceptance angle "θ" for the photocell 44 at a constant and thus maintain the amount of light received by the photocell at a relative constant level. Towards this end, the carriage 27 is provided with a gate 71 which is adapted to open the viewing aperture as the lens carriage 27 moves the lens 22 away from the photocell from position "a" to position "b".

Figure 5:
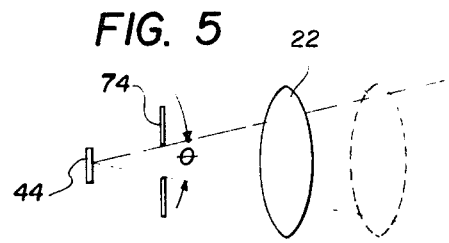
FIG. 5 is a schematic showing of another alternative lens assembly which may be used with the FIG. 2 apparatus.
Figure 6:
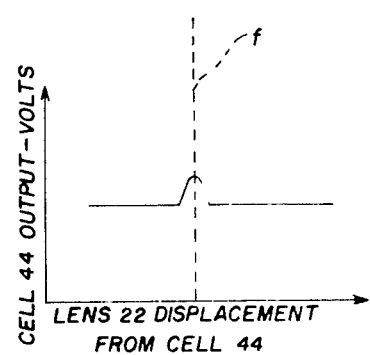
FIG. 6 is a curve showing the lens displacement vs. photocell output relationship prevailing for either lens assembly of FIGS. 4 or 5.

Alternatively, a similar effect (viz. maintaining a constant angle θ) may be attained by use of a fixed stop 74 (FIG. 5) positioned between the lens 22 and the photocell 44. For both of the embodiments of FIGS. 4 and 5, the output of the photocell 44 will be a smooth, straight line output curve (except for the best focus perturbation) such as shown in FIG. 6 will be realized. This type of an output will facilitate detection by the circuitry 60 wherein the switch 81 may be a conventional threshold detector.

The invention has been described in detail with particular reference to the preferred embodiments thereof, but it will be understood that variations and modifications can be effected within the spirit and scope of the invention.

I claim:
1. In rangefinder apparatus for positioning an objective lens with respect to a film plane to focus an image of an object in the film plane, the combination comprising:
   a. means including a source of radiation for projecting on the object a contrast pattern;
   b. photosensitive means adapted to produce an electrical output having a parameter related in magnitude to radiation received by said photosensitive means;
   c. a second lens disposed to receive light reflected from the object to form a reflected image of at least a portion of the object and at least a portion of said contrast pattern on said photosensitive means;
   d. first means for varying the distance between said second lens and said photosensitive means to focus the image formed by said second lens on said photosensitive means; the output parameter of said photosensitive means being related to the magnitude and contrast of the reflected light and having a particular discernable output when the contrast pattern is focused by said second lens on said photosensitive means; and
   e. second means coupled to said photosensitive means and responsive to said particular output for focusing the objective lens.

2. In rangefinder apparatus for positioning an objective lens with respect to a film plane to focus an image of an object in the film plane, the combination comprising:
   a. means including a source of radiation pulsated at a predetermined frequency for projecting on the object a contrast pattern;
   b. photosensitive means adapted to produce an electrical output having a parameter related in magnitude to radiation received by said photosensitive means;
   c. a second lens disposed to receive light reflected from the object to form a reflected image of at least a portion of the object and said contrast pattern on said photosensitive means;
   d. first means for varying the distance between said second lens and said photosensitive means to focus the image formed by said second lens on said photosensitive means; the output parameter of said photosensitive means being related to the magnitude of the reflected light and contrast and having a particular discernable output when the contrast pattern is focused by said second lens on said photosensitive means;
   e. second means coupled to said photosensitive means and adapted to detect said particular output and produce a signal; and
   f. third means responsive to said detected output signal for focusing the objective lens.

3. The invention as set forth in claim 2 wherein said second means includes circuitry having a band-pass filter centered on said predetermined frequency.

4. The invention as set forth in claim 3 wherein said projecting means includes a transparency disposed between said source of radiation and the object.

5. In rangefinder apparatus for positioning an objective lens with respect to a film plane to focus an image of an object in the film plane, the combination comprising:
   a. a source of radiation;
   b. means including a second lens disposed in a cooperative relation with said radiation source for projecting an image having a contrast pattern on the object;
   c. photosensitive means adapted to produce an electrical output having a parameter related in magnitude to radiation received by said photosensitive means;
   d. a third lens disposed to receive light reflected from the object to form a reflected image of at least a portion of the object and said contrast pattern on said photosensitive means;

e. first means for varying the distance between said objective lens and the object and said second lens and said photosensitive means to simultaneously focus the image formed by said second lens on the object and the image formed by said third lens on said photosensitive means; the output parameter of said parameter of said photosensitive means being related to the magnitude of the reflected light and having a particular discernable output when the contrast pattern is focused by said second lens on said photosensitive means; and f. means coupled to said photosensitive means and responsive to said particular output for focusing the objective lens.

6. The invention as set forth in claim 5 wherein said projecting means includes a transparency disposed between said source of radiation and the object.

7. The invention as set forth in claim 6 wherein both said second and third lenses are substantially identical and are disposed to be substantially the same distance from the object.

8. The invention as set forth in claim 6 wherein said detecting means includes circuitry having a band-pass filter centered on said selected frequency.

9. The invention as set forth in claim 6 wherein said projecting means includes a transparency disposed between said source of radiation and the object.

10. The invention as set forth in claim 9 wherein said transparency has a checkerboard pattern.

11. The invention as set forth in claim 10 including means for maintaining the acceptance angle of said photosensitive means at a constant.

12. In a rangefinder apparatus for finding the distance of an object, the combination comprising: photosensitive means having an electrical output related to the magnitude of incident radiant energy, a source of radiation, means cooperative with said radiation source for projecting an image having a contrast pattern upon the object, a lens disposed in cooperative relation with said photosensitive means for receiving radiation reflected from the object, means coupled to said lens for varying the distance between said lens and the object to move said lens in relation to said photosensitive means through a position wherein said lens focuses radiation reflected from the object including the contrast pattern to said photosensitive means, said photosensitive means having a particular output when said lens is moved through said focus position, and means coupled to said photosensitive means and responsive to said electrical output for detecting said particular output.

* * * * *